United States Patent Office 2,910,451
Patented Oct. 27, 1959

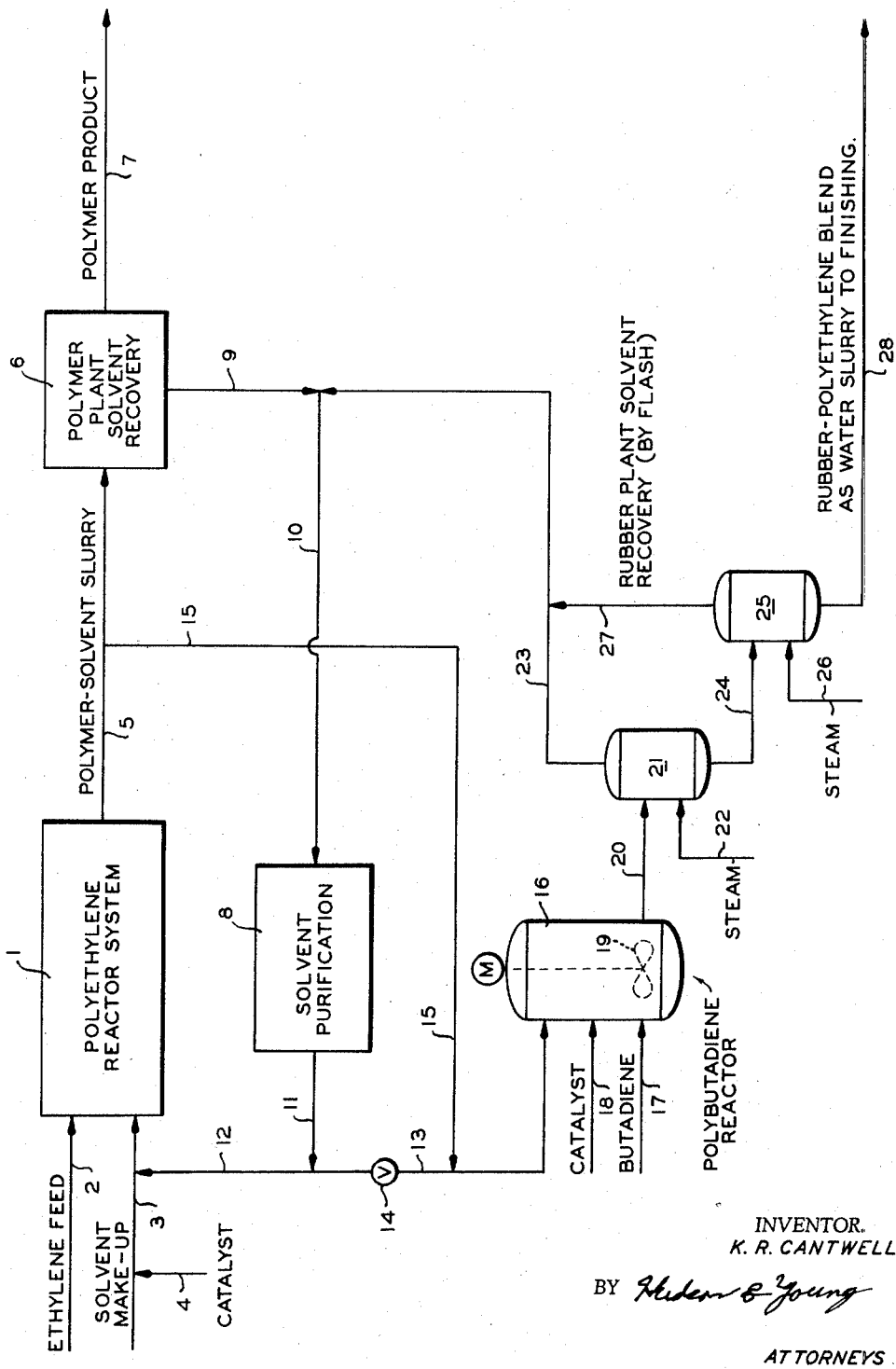

2,910,451
BLENDING POLYMERS OF 1-OLEFINS WITH SYNTHETIC RUBBER

Kenneth R. Cantwell, Bartlesville, Okla., assignor to Phillips Petroleum Company, a corporation of Delaware Application January 9, 1957, Serial No. 633,346

9 Claims. (Cl. 260—45.5)

This invention relates to a novel process for preparing blends of 1-olefin polymers and rubbery polymers. In one of its aspects, this invention relates to a novel process for preparing blends of polyethylene and butadiene polymers.

With the development of new and improved 1-olefin polymers much attention has been given to blends of such polymers with rubbers, particularly synthetic rubbers as prepared by polymerizing monomers comprising a major amount of a conjugated diene such as butadiene. Application Serial No. 543,249, filed October 27, 1955, of R. V. Jones, and now abandoned, discloses new compositions, these being mixtures of specially prepared tacky and/or solid polymers of 1-olefins with natural or synthetic rubber.

Properties of the polymer compositions vary from fairly rigid plastics to rubbery materials, depending on the type and amount of each component and whether or not the polymer blend is vulcanized. The amount of poly-1-olefin, e.g., ethylene polymer, incorporated into the rubbery material, may vary from 0.5 to 99.5 parts by weight per 100 parts of the polymer blend. Rubbery materials prepared in accordance with the process of that invention are suitable for the many uses where rubbers are employed. Compositions prepared with high molecular weight polyethylene, for example, are applicable for shoe sole stocks and heels. The reduction in air permeability of rubber stocks compounded with 1-olefin polymers makes them valuable for use in the fabrication of tubeless tires. Thermoplastic molding compositions suitable for manufacturing various types of molded objects, extruded materials such as pipes, wire coatings, etc., may be obtained. The presence of a rubbery material in the olefin polymer, even in relatively small quantities, gives thermoplastic stocks which are easier to extrude and which have good impact strength.

Although it has been found that 1-olefin polymer-rubbery polymer blends are desirable for many purposes, problems of facilitating blending have persisted. Such materials are sometimes relatively difficult to blend with conventional blending equipment such as a rubber mill without the addition of large amounts of plasticizer plus heating and even then complete dispersion is sometimes relatively difficult.

I have now found an improved method of preparing blends of 1-olefin polymer and polymers of conjugated dienes.

An object of this invention is to provide a novel method of preparing blends of 1-olefin polymers and rubbery polymers.

Another object of this invention is to provide a process for preparing 1-olefin polymer blends with rubbery polymers wherein the processes for the preparation of the two polymers are integrated thereby utilizing the same diluent and diluent purification zone.

Other objects, advantages and features of this invention will be apparent to those skilled in the art having been given this disclosure.

According to this invention, a slurry of 1-olefin polymer is blended with a conjugated diene and the blend recovered from liquid. The 1-olefin polymer slurry can be introduced directly into the conjugated diene polymerization reactor or can be introduced to the diene polymer solution later and the blend thereafter coagulated.

As has been indicated, the 1-olefin polymers to which this invention is applicable are usually, though not necessarily, those polymers prepared in the presence of a liquid hydrocarbon diluent. Such polymers can be prepared by the well known high pressure method but for many applications, those polymers prepared by the newer catalytic low pressure processes are desired. Such low pressure processes employ organo-metal catalysts such as those disclosed by Karl Ziegler in Belgian Patent 533,362, November 16, 1954, or preferably a chromium oxide catalyst such as is disclosed in the copending application of Hogan and Banks, filed March 26, 1956, Serial No. 573,877, now Patent No. 2,825,721. The polymer prepared by the Hogan and Banks method has many advantages over the conventional polymers and is especially useful in the composition of Jones, supra. The Hogan et al. application discloses a process for producing novel polymers of 1-olefins preferably from 1-olefins having 2 to 8 carbon atoms per molecule and having no branching nearer the double bond than the 4-position. The polymerization is carried out at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high temperature, i.e., 450 to 1500° F. and preferably within the range of 900 to 1000° F., treatment under non-reducing conditions and preferably with an oxidizing gas. This catalyst can suitably be used in a size range up to 40 mesh but can be microspherical. Olefins, other than 1-olefins as described, are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or cycloparaffin which is liquid under the polymerization conditions. The conjugated diene can also be polymerized with this catalyst by the process of Hogan et al. When using an alkali metal catalyst such as sodium, I prefer to use a lower temperature of polymerization, e.g. 30–50° F.

Examples of suitable 1-olefins include ethylene, propylene, 1-butene, 1-pentene, 1-hexene, 1-octene, 4-methyl-1-pentene, 4-methyl-1-hexene, 4-ethyl-1-hexene, 6-methyl-1-heptene, 4-methyl-1-heptene, and the like.

Diluent and emulsion polymerization of conjugated dienes are well known to the art. In general, the conjugated diene alone or with copolymerizable monomers can be polymerized at a temperature within the range of 25 to 150° F. and at a pressure sufficient to maintain the reactants in liquid state although polymerization recipes employing both higher and lower temperatures are known to the art.

One preferred conjugated diene polymer useful in this invention is that polymer prepared in the presence of a hydrocarbon diluent from monomers comprising at least 50 weight percent conjugated dienes. Such polymer is normally rubbery. The polymers useful in this invention are of open-chain conjugated dienes preferably having from 4 to 8 carbon atoms exemplified by 1,3-butadiene; 2,3-dimethyl-1,3-butadiene; chloroprene and the like, and the rubbery copolymers of these and similar conjugated dienes with each other or with copolymerizable monomeric material containing a single ethylenic linkage, such as styrene, alpha-methylstyrene, methyl acrylate, methyl methacrylate, ethyl acrylate, ethyl methacrylate, 2-vinylpyridine, 2-methyl-5-vinylpyridine, 2-ethyl-5-vinyl-pyridine, and similar materials.

These conjugated diene polymers can be prepared by the older well known mass polymerization systems for example in the presence of an alkali metal catalyst such as sodium. However, for many uses a rubber similar to natural rubber, e.g., of the cis-configuration, is preferred. Synthetic rubbers of this type have recently been developed and are described in the copending application of Smith et al., filed April 16, 1956, and having Serial No. 578,166. According to that application, 1,3-butadiene is polymerized in the presence of a catalyst composition comprising (a) a trialkylaluminum and (b) titanium tetraiodide. The polybutadiene produced by the method of that invention is a rubbery polymer which contains as high as 90 percent and higher cis 1,4-addition. When titanium tetrachloride is employed in place of the titanium tetraiodide, the polymer is formed preponderantly by 1,2-addition. The trialkylaluminum can be represented by the formula $R_3Al$, wherein R is an alkyl radical containing up to and including 6 carbon atoms. The alkyl groups can be either straight or branched chain alkyls, for example, ethyl, propyl, isopropyl, n-butyl, isobutyl, pentyl, isohexyl or n-hexyl. The R's can be same or different. The polymerization can be carried out at any temperature within the range of 0 to 150° C. and preferably in the range of 50 to 122° F. While the polymerization can be carried out in the absence of a diluent, it is preferred that the polymerization be carried out in the presence of a hydrocarbon diluent which can be aromatic, paraffinic, or cycloparaffinic. For the purpose of the present invention, it is preferred to use a paraffin or cycloparaffin as previously described for the Hogan et al. polymerization when using that particular 1-olefin polymer. It is, of course, within the scope of the present invention to replace one solvent with another, however, this generally will not be necessary. When polymerizing the butadiene in the presence of a solvent, as in the present invention, sufficient pressure will be used to maintain the reactants and solvent in liquid phase. The amount of catalyst employed can vary over a wide range. The concentration of catalyst is usually in the range of 0.05 to 10 weight percent, preferably with the range of 0.05 to 5 weight percent based on the weight of butadiene charged. While the ratio of trialkyl aluminum to the titanium tetraiodide can vary from 1.25:1 to 50:1, it is preferred to use a ratio of 2.5:1 to 10:1.

The diluents especially useful in the polymerization of this invention are hydrocarbons and preferably paraffins including cycloparaffins. These diluents or solvents include paraffins and cycloparaffins having 3 to 12 carbon atoms per molecule, however, any hydrocarbon which is relatively inert, non-deleterious, and liquid under the operating conditions of the process can be utilized. Diluents that have been successfully used in the polymerization reaction and are operable in the present invention include propane, isobutane, normal butane, normal pentane, isopentane, isooctane (2,2,4-trimethylpentane), cyclohexane and methylcyclohexane. Unsaturated aliphatic and cyclic hydrocarbons are, in general, not used in the polymerization reactions since they are likely to enter the polymerization reaction. However, insofar as they serve as diluents, any of these hydrocarbons are operable in the present invention.

In general, the 1-olefin polymers are not soluble in the diluents at a temperature below about 200° F. or even higher and polymers formed below this temperature form as solid particles. As has been indicated, it is generally preferred to polymerize the conjugated diene below about 100° F. Therefore, the conjugated diene will be polymerized in the presence of discrete particles of 1-olefin polymer. However, it is within the scope of the invention to polymerize the conjugated diene at the higher temperature in which case the chromium oxide catalyst will catalyze the reaction.

In another embodiment of this invention, the conjugated diene is polymerized in an emulsion system. It is within the scope of the invention to introduce the 1-olefin polymer directly into the reactor or to introduce it to the resulting latex. In either case, it is preferred to concentrate the 1-olefin polymer slurry to prevent the formation of two phases. When introduced to the reactor, as is well known to the art, the polymerization recipe will have to be adjusted since the introduction of additional hydrocarbon will affect polymerization rates and will affect the combining ratio when both conjugated diene monomers and other monomers such as styrene are present. When emulsion polymerization of the conjugated diene is employed, it is preferred that the 1-olefin polymer be recovered from the hydrocarbon diluent by replacement with water such as is fully described and claimed in the copending application of R. G. Wallace, Serial No. 584,812, filed May 14, 1956. According to that application, polymeric 1-olefin solution from the reactor is admixed with water thereby precipitating polymer as a slurry in the water and displacing hydrocarbon. This water slurry can then be admixed with the conjugated diene latex or it can be used as the water for preparing the conjugated diene emulsion. In either case, when the latex is coagulated, such as by an acid, the latex and 1-olefin polymer will exist as an intimate mixture of rubber and resin which can be readily separated from the liquid phase.

This invention can best be described by reference to the attached drawing which is a block flow diagram of the process of a preferred embodiment of this invention.

The process will be described with reference to preparing a blend of polyethylene as prepared by the method of Hogan and Banks with polybutadiene and with a rubber prepared from butadiene by the method of Smith et al.

Referring to the drawing, the 1-olefin is fed to the polymerization system 1 via conduit 2. This polymerization system includes a reactor, means for removing catalyst if so desired and means for cooling. At the same time a suitable solvent containing catalyst is added to the polymerization reactor system via conduit 3, the catalyst being supplied to conduit 3 via conduit 4. The reactants at a temperature below the precipitation temperature of the polymer are removed from zone 1 via conduit 5. As shown, the capacity of the 1-olefin polymer reactor system is greater than that desired for blending and a portion of the polymer slurry passes to polymer-solvent recovery system 6. The polymer is separated from solvent in zone 6 by any suitable means such as filtration, steam stripping, etc., and the polymer dried and removed via conduit 7. The solvent is removed from zone 6 and passed to solvent purification zone 8 via conduits 9 and 10. The purified solvent is removed from purification zone 8 via conduit 11 and at least a part of this solvent sent to the 1-olefin polymerization system 1 via conduit 12. The polymer slurry from conduit 5 desired for blending passes via conduit 15 to the rubber polymerization reactor 16. Provision is made to increase the amount of solvent to reactor 16 by directing a portion of the solvent from solvent purification in conduit 11 to conduit 15 via conduit 13 and valve 14. The monomer comprising conjugated diene is added to reactor 16 via conduit 17 and catalyst is added via conduit 18. This reactor is provided with a stirrer 19. The conjugated diene is polymerized in solution in the presence of the solid 1-olefin polymer. The effluent from reactor 16 comprising conjugated diene polymer in solution and 1-olefin polymer in slurry is passed via conduit 20 to steam stripper 21 wherein steam is admitted via conduit 22. The overhead, comprising the solvent and steam, passes via conduits 23 and 10 to solvent purification zone 8. The rubbery polymer comes out of solution when solvent is replaced with water and forms an admixture with the ethylene polymer. The effluent from steam stripper 21 passes via conduit 24 to a second stripper 25 wherein any remaining solvent is removed overhead via conduit 27 to conduit 23. The effluent from this steam stripper 25 comprising 1-olefin polymer and conjugated diene polymer in a water slurry is removed via conduit 28 and sent to recovery zone, not shown.

The blend as recovered comprises rubber having particles of 1-olefin polymer uniformly dispersed therein. Since these 1-olefin polymers are of appreciable size, for a completely homogeneous blend, the material can be masticated such as on a rubber mill. By such procedure, the desired homogeneous blends are readily obtained without the difficulties encountered when the rubbery polymer and the 1-olefin polymer are separately added to the mill. However, if the conjugated diene is polymerized at a temperature above the solution temperature of the 1-olefin polymer, then the blend will tend to be homogeneous as formed. However, even without milling, the rubber-1-olefin blend obtained is uniform and suitable for many uses.

Those skilled in the art will see many modifications which can be made in the above-described process without departing from the scope of the invention. For example, a two-stage steam stripping step is shown for separating solvent from the blend. A single stage step can be employed or several steps can be employed. Other separation methods as known in the art can be employed. Only sufficient 1-olefin polymer slurry can be made for blending, other means of agitation in the reactor can be employed, etc.

A preferred embodiment will now be described wherein polyethylene is being blended with polybutadiene. The polyethylene is prepared by the method of Hogan et al., supra, and the polybutadiene is prepared by the method of Smith et al., supra. Cyclohexane is employed as the solvent. This embodiment will be described in conjunction with the drawing.

Ethylene, solvent and catalyst are continuously fed to reaction zone 1 via conduits 2, 3 and 4, respectively, in a solvent to ethylene ratio to provide a 4.5% polyethylene slurry and catalyst at a rate to provide 0.3% by weight chromium based on reactor charge. This catalyst is 0.5 weight percent chromium as the oxide on a 90–10 silica-alumina support which had been activated in dry air at 950° F. and is microspherical in size. The reactor is maintained at 285° F. and a pressure of 450 p.s.i.g. and is of sufficient size to provide 1 hour residence time. The effluent from the reactor is flashed to remove unpolmerized ethylene and is filtered to remove catalyst. During the filtering step, it is necessary to maintain the temperature sufficiently high to maintain the polymer in solution. After filtering, the solution is cooled to precipitate the polymer and the pressure lowered. The polymer then exists as a 4.5 percent slurry in cyclohexane. The slurry is then passed via conduit 15 to reactor 16. At the same time, butadiene at a rate to provide 100 weight parts butadiene per 30 parts of polyethylene is passed to reactor 16 and 0.5 weight percent catalyst based on butadiene is supplied via conduit 18. This catalyst is a mixture of 2.5 parts triisobutyl aluminum and 1 part titanium tetraiodide. The reactor operates at 5 p.s.i.g. and 120° F. and is of sufficient size to provide 1 hour residence time. The effluent from reactor 16 passes to a two stage steam stripping zone, strippers 21 and 25, wherein the solvent is distilled off and passed to zone 8 for recovery of cyclohexane. The cyclohexane is then returned to zone 1 as diluent from additional ethylene. The rubber coagulates upon removal of solvent and the rubber and polyethylene in a water slurry are removed from the stripping zone, the water removed, and the mixed polymer dried. The polyethylene is present as fine particles uniformly dispersed in the rubber. This mixture is easily masticated to a smooth, homogeneous blend.

The above embodiment clearly demonstrates the ease of preparing blends by the method of this invention. This embodiment should not be considered limiting. Those skilled in the art should readily recognize that other polymer blends can readily be effected as disclosed in the specification.

I claim:

1. A method for preparing mixtures of 1-olefin polymers and conjugated diene polymers which comprises polymerizing a 1-olefin of 2 to 8 carbon atoms and no branching nearer the double bond than the 4-position in the presence of a liquid nonpolymerizable hydrocarbon, adding a conjugated diene to the resulting polymer-hydrocarbon mixture, polymerizing the conjugated diene in said mixture and thereafter recovering the mixture of polymer from the hydrocarbon.

2. A method for preparing mixtures of 1-olefin polymers and conjugated diene polymers which comprises polymerizing a 1-olefin of 2 to 8 carbon atoms and no branching nearer the double bond than the 4-position in liquid phase polymerization in the presence of a liquid nonpolymerizable hydrocarbon, cooling the resulting admixture to below the precipitation temperature of the resulting polymer, polymerizing a conjugated diene in the presence of the resulting slurry, and recovering the mixture of polymers from the diluent.

3. A method for preparing mixtures of 1-olefin polymers and conjugated diene polymers which comprises polymerizing a 1-olefin of 2 to 8 carbon atoms and no branching nearer the double bond than the 4-position at a temperature below the solution temperature of the polymer being formed and in the presence of a liquid nonpolymerizable hydrocarbon diluent, polymerizing a conjugated diene in the presence of the resulting slurry and recovering the resulting mixture of polymers from the slurry.

4. A method for preparing homogeneous mixtures of 1-olefin polymers and conjugated diene polymers which comprises polymerizing a 1-olefin of 2 to 8 carbon atoms and no branching nearer the double bond than the 4-position in the presence of a hydrocarbon selected from the group consisting of paraffins and cycloparaffins of 3 to 12 carbon atoms per molecule in the liquid phase, polymerizing a conjugated diene in the presence of the resulting mixture, separating the mixture of polymers from the diluent and masticating the mixture of polymers until homogeneous.

5. A method for preparing homogeneous mixtures of 1-olefin polymers and conjugated diene polymers which comprises polymerizing a 1-olefin of 2 to 8 carbon atoms and no branching nearer the double bond than the 4-position in a hydrocarbon solution, said hydrocarbon being selected from the group consisting of paraffins and cycloparaffins of 3 to 12 carbon atoms per molecule, and in the presence of 0.1 to 10 weight percent chromium as chromium oxide and at a temperature within the range of 150–500° F. under sufficient pressure to maintain the reactants in liquid phase; separating unpolymerized monomers from the resulting polymer solvent mixture; cooling the mixture to below the precipitation temperature of the polymer; polymerizing a conjugated diene in the presence of the resulting slurry and in the presence of 0.05 to 5 weight percent based on the conjugated diene of a catalyst comprising 1.25 to 5 parts of a trialkyl aluminum per part of titanium tetraiodide wherein each alkyl radical of said trialkyl aluminum contains one to six carbon atoms, last said polymerization being carried out at a temperature in the range of 0 to 150° C. and under sufficient pressure to maintain the reactants in liquid state; stripping the hydrocarbon solvent from the resulting slurry and thereafter recovering the resulting mixture.

6. The process of claim 5 wherein the 1-olefin is ethylene, the conjugated diene is 1,3-butadiene and the hydrocarbon solvent is cyclohexane.

7. The process of claim 5 wherein the trialkyl aluminum is triisobutyl aluminum.

8. The process of claim 5 wherein the trialkyl aluminum is triethyl aluminum.

9. A process for preparing blends of 1-olefin polymers and conjugated diene polymers which comprises polymerizing a 1-olefin of 2 to 6 carbon atoms per molecule and having no branching nearer the double bond than the 4-position in the presence of a liquid hydrocarbon, displacing said hydrocarbon diluent with water thereby resulting in a slurry of 1-olefin polymer in water, emulsifying a conjugated diene in said water in presence of said 1-olefin polymer, polymerizing said conjugated diene, coagulating the resulting conjugated diene polymer and recovering the resulting mixture of 1-olefin and conjugated diene polymer solids from the liquid.

References Cited in the file of this patent

UNITED STATES PATENTS

| | | |
|---|---|---|
| 2,268,208 | Loukomsky | Feb. 10, 1953 |
| 2,709,689 | Herzog et al. | May 31, 1955 |
| 2,832,748 | Safford | Apr. 29, 1958 |